May 15, 1945. C. D. P. SMALLPEICE 2,376,017
GLAND
Filed June 10, 1943
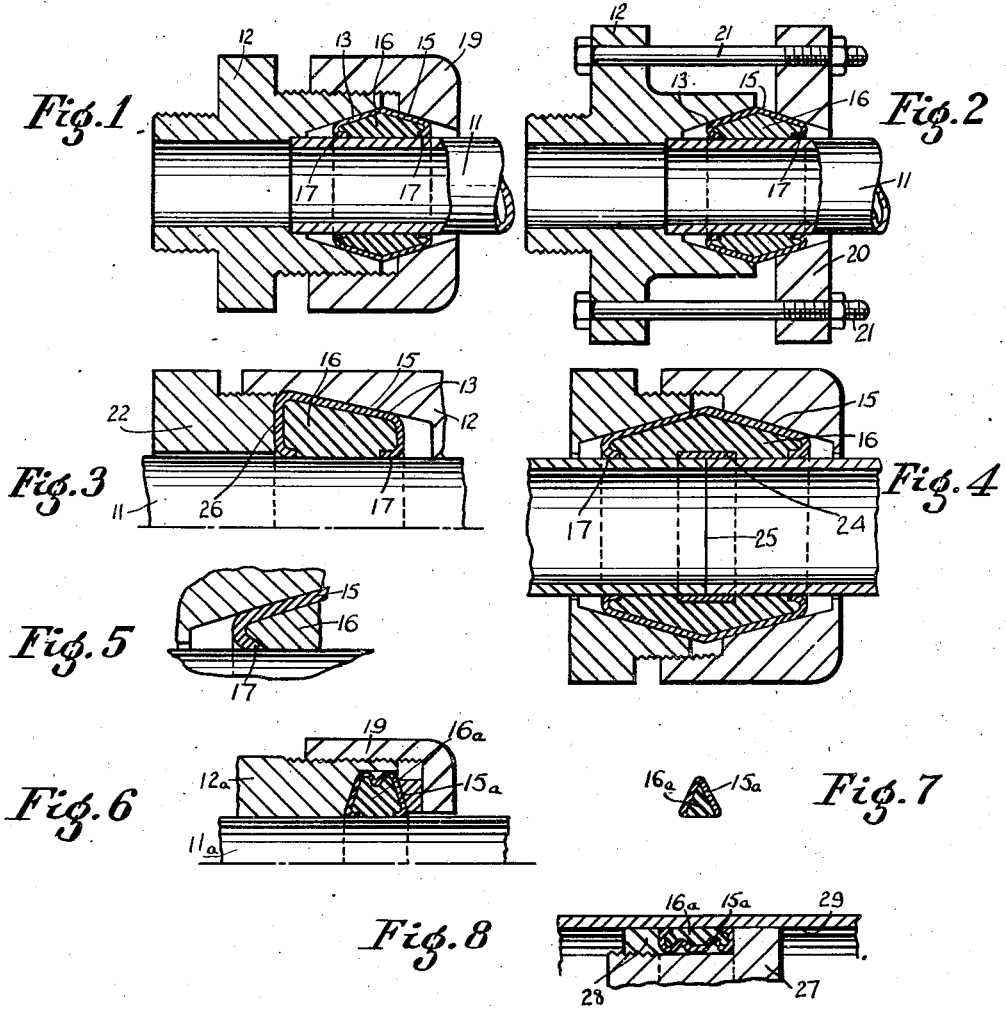
Inventor
Cosby D. P. Smallpeice
by Mawhinney & Mawhinney
Attorneys Patented May 15, 1945

2,376,017

UNITED STATES PATENT OFFICE 2,376,017

GLAND

Cosby Donald Philipps Smallpeice, Southampton, England

Application June 10, 1943, Serial No. 490,359
In Great Britain July 25, 1942

3 Claims. (Cl. 285—166)

This invention relates to glands (and, although it is particularly applicable to glands for stationary pipes or the like, it is not restricted in this respect) of the kind comprising an annular casing open on the operative side (i. e., where it is to abut a stationary pipe or the like, or a rotatable or reciprocable shaft, cylinder or the like) and formed of a metal or alloy or other material which is harder or less flexible than a filling in the interior of the annular casing. The latter may have a frusto-conical surface on its other side to coact with a suitably-shaped surface when the gland is tightened axially whereby to press the filling radially.

My main object is to provide an improved gland of this kind, and particularly one of which the edges of the casing extend slightly towards one another on the operative side, so as partly to enclose the filling and act as a seal or scraper.

For an understanding of this and other objects and advantages of the invention attention should be directed to the following description referring to the various arrangements illustrated somewhat diagrammatically in the accompanying sheet of drawings, in which:

Figure 1 is a sectional elevation showing one form of gland according to the invention, mounted round a stationary pipe which is secured to a socket by means of a female nut;

Figure 2 is a similar view but showing, instead of the nut, a stuffing box plate for tightening the gland;

Figure 3 is a fragmentary sectional elevation showing a gland according to the invention having a single frusto-conical surface, the gland being secured in position by a male nut;

Figure 4 is a sectional elevation showing two pipes joined end to end by a gland according to the invention;

Figure 5 is an enlarged fragmentary sectional view of the gland showing how the edges of the gland casing may be arranged;

Figure 6 is a fragmentary sectional elevation of a gland according to the invention for a rotatable or reciprocable shaft;

Figure 7 is a cross-section showing another form the gland may take for such purpose; and Figure 8 shows a gland according to the invention mounted on a piston to coact with a cylinder one of which is reciprocable with respect to the other.

Like reference numerals are applied to similar parts in the different figures as far as possible.

With reference first to Figures 1, 11 represents a stationary pipe mounted in a counter-bore of a socket 12 having a frusto-conical surface 13 round the pipe to coact with a similar surface of the gland. The latter comprises a casing 15 open on its operative side adjacent the stationary pipe and containing a filling 16, the edges 17 of the casing extending slightly towards one another. Axial pressure is applied to the other end of the gland in any convenient manner, as by means of a female nut 19 having an internal taper corresponding to a second taper on the gland.

In Figure 2, a stuffing box plate 20 can be drawn up to compress the gland by means of bolts 21, and in Figure 3 a male nut 22 is used.

The casing 15, as stated, is preferably of copper, bronze or the like, or it may be of thin sheet steel, and the filling 16 is of a less hard or more flexible material such as lead or white metal, or it may be much more flexible, for example, of rubber.

To ensure a good joint the operative surface of the filling 16 may be coated with an appropriate cement—for example mercury in the case of a galvanised pipe, or with a mouldable material such as Bakelite which will consolidate under the applied pressure, or the filling itself may be an amalgam or cement.

Figure 4 shows a ring 24 which may be of a hard material so as to prevent the filling from being forced through the joint 25 of the two pipe ends.

Referring again to Figure 3, by arranging the taper 13 to be sufficiently slow, and by strengthening the larger end 26 of the casing, it may be possible, for some cases, to drive the gland into position with a drift, the nut 22 being dispensed with.

Figure 5 indicates how the inturned edges 17 of the casing may be somewhat pointed in practice to act as a scraper.

In the construction of Figure 6 the corrugated casing 15a of the gland is of white metal or other anti-friction material, and the filling is flexible and of an oil-retaining material such as is commonly used in a stuffing box, and obviously, the gland may take other shapes than that shown—for example, as indicated in Figure 7. The shaft 11a is in this case assumed to be rotatable or reciprocable, and the gland is held to the socket 12a by a female nut 19.

In the construction of Figure 8 the gland, comprising the corrugated casing 15a with truly-radial ends and the filling 16a, is held on a reduced portion of the piston 27 by a nut 28 thereon, which when tightened presses the filling of the gland radially outwardly into contact with the cylinder wall 29.

What I claim as my invention and desire to secure by Letters Patent of the United States is:

1. Means for coupling together pipes including a pair of flange members encircling the pipes, means for drawing said flange members towards one another, said members jointly providing an interior recess round the pipes of which the exterior wall is of opposed frusto-conical shape, and a continuous packing ring in said recess comprising a metallic casing the outer wall of which is of similar opposed frusto-conical shape to coact with the walls of said flange members, and a filling in the interior of said casing which is more flexible than said casing and which engages the pipe surfaces, said casing having inturned edges at its inner periphery which also engage the pipe surfaces, and a relatively rigid ring carried by said filling between said inturned edges of the casing to prevent said filling from squeezing between the adjacent ends of said pipes under applied pressure.

2. For use in coupling together pipes, a continuous packing ring comprising a metallic casing the outer wall of which is of opposed frusto-conical shape, and a metallic filling in the interior of said casing which is more ductile than said casing, said casing having inturned edges at its inner periphery which extend slightly towards one another so as to partly enclose said filling, said filling between the edges being in line with edges to engage the pipe.

3. For use in coupling together pipes, a continuous packing ring comprising a metallic casing the outer wall of which is of opposed frusto-conical shape, a metallic filling in the interior of said casing which is more ductile than said casing, said casing having inturned edges at its inner periphery which extend slightly towards one another so as to partly enclose said filling, and a relatively-rigid ring carried by said filling between said inturned edges to prevent said filling from squeezing between the adjacent ends of said pipes under applied pressure, said inturned edges, said filling and said rigid ring all adapted to engage the pipe surfaces, said ring and parts of the filling between the ring and said inturned edges being in line with the edges to engage the pipe.

COSBY DONALD PHILIPPS SMALLPEICE.